(12) United States Patent  (10) Patent No.: US 6,735,390 B1
Prasanna  (45) Date of Patent: May 11, 2004

(54) METHOD AND APPARATUS FOR TERMINATING OPTICAL LINKS IN AN OPTICAL NETWORK

(75) Inventor: G. N. Srinivasa Prasanna, Bridgewater, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 465 days.

(21) Appl. No.: 09/702,321

(22) Filed: Oct. 31, 2000

(51) Int. Cl.$^7$ ............................ H04B 10/00; G02F 1/00
(52) U.S. Cl. ..................... 398/3; 398/5; 398/6; 398/26; 398/15; 398/83
(58) Field of Search ........................... 398/2–5, 59, 83, 398/175, 26, 6, 15; 370/222, 227, 228

(56) References Cited

U.S. PATENT DOCUMENTS

| | | | | |
|---|---|---|---|---|
| 5,442,623 A | * | 8/1995 | Wu | 370/224 |
| 5,717,796 A | * | 2/1998 | Clendening | 385/24 |
| 5,745,476 A | * | 4/1998 | Chaudhuri | 370/222 |
| 6,046,832 A | * | 4/2000 | Fishman | 398/45 |
| 6,115,154 A | * | 9/2000 | Antoniades et al. | 398/4 |
| 6,195,186 B1 | * | 2/2001 | Asahi | 398/5 |

FOREIGN PATENT DOCUMENTS

| | | |
|---|---|---|
| EP | 0 620 694 A2 | 4/1994 |
| EP | 1 039 773 A2 | 3/2000 |
| EP | 1 162 855 A1 | 6/2000 |

OTHER PUBLICATIONS

Goldstein et al., "Multiwavelength Opaque Optical–Cross-connect Networks," Institute of Electronics Information and Comm. Eng., Tokyo, Japan, vol. E82–C, No. 8, 1361–1370, Aug. 1999.
Lehr et al., "Management of All–Optical WDM Networks: First Results of European Research Project MOON," Network Operations and Management Symposium, 870–879, Feb. 1998.
Mader et al., "MOON: Management of Optical Networks," MOON Consortium: MOON Final Report, 1–49, Sep. 1996.

* cited by examiner

Primary Examiner—Kinfe-Michael Negash

(57) ABSTRACT

A method and apparatus are disclosed for terminating optical links in an optical network based on performance requirements. The present invention forces the termination of the received optical signals at each node only on the protection ring and does not force termination on the working ring, unless necessary to satisfy performance requirements. A signal on an end-to-end light path on the working ring is terminated only when required by engineering rules, such as signal-to-noise requirements. Specifically, the present invention does not force terminate an end-to-end light path on the working ring at a given node (or on a link between two nodes) unless the signal will fail to meet certain criteria, such as a minimum optical signal-to-noise ratio, at the next node.

15 Claims, 3 Drawing Sheets

METHOD AND APPARATUS FOR TERMINATING OPTICAL LINKS IN AN OPTICAL NETWORK

FIELD OF THE INVENTION

The present invention relates generally to the field of optical communications, and more specifically, the present invention discloses a method and apparatus for terminating optical links in an optical add-drop multiplexer (OADM).

BACKGROUND OF THE INVENTION

Optical wavelength division multiplexing (WDM) techniques are increasingly being employed in fiber optic communication systems. WDM systems transmit information signals over optical fibers using optical signals of different wavelength, often referred to as carrier signals. Thus, WDM techniques allow a significant number of information signals to be transmitted over a single optical fiber.

While such WDM techniques provide substantially higher fiber bandwidth utilization, such WDM techniques suffer from a number of limitations, which, if overcome, could further improve the performance and bandwidth utilization of such WDM systems. Fiber optic communications networks are typically arranged in a number of topological configurations. For example, a fiber optic network can consist of two terminals communicating data over an optical link. As additional terminals are included in an optical network, they may be linked in a daisy-chain configuration in series by a plurality of optical links. Alternatively, ring configurations can also used, as well as other two-dimensional networks. Bidirectional optical links between two terminals typically include a plurality of optical fibers to provide redundancy in the event of a failure in an optical fiber.

A number of techniques have been proposed or suggested for routing an optical signal at a given node, based on wavelength. Optical networks often include optical add-drop multiplexers (OADM) having one or more input and output fibers, where an incoming optical signal may either be passed through the node or routed to a local destination, based on its wavelength. In order to allow the optical network to be dynamically reconfigured, all fibers are currently terminated at each node (i.e., at the end of each link) in the optical network, and the signal is restored at the beginning of each link. Such forced termination at each node, however, unnecessarily increases system costs. A need therefore exists for a new method and apparatus for terminating optical links in an optical network that reduces system costs and maintains satisfactory quality levels of the optical line system (OLS) at the output of such nodes.

SUMMARY OF THE INVENTION

Generally, a method and apparatus are disclosed for terminating optical links in an optical network. The present invention recognizes that while the forced termination of the protection ring at each node is generally desirable to permit dynamic reconfiguration of the protection ring in the event of a failure, such forced termination is not necessary on the working ring and unnecessarily increases system cost. Thus, in accordance with the present invention, each node forces the termination of the received optical signals only on the protection ring and does not force termination on the working ring unless necessary.

According to one aspect of the invention, a signal on an end-to-end light path on the working ring is terminated only when required by engineering rules, such as signal-to-noise requirements. Specifically, the present invention does not force terminate an end-to-end light path on the working ring at a given node (or on a link between two nodes) unless the signal will fail to meet certain criteria, such as a minimum optical signal-to-noise ratio, at the next node.

A more complete understanding of the present invention, as well as further features and advantages of the present invention, will be obtained by reference to the following detailed description and drawings.

DETAILED DESCRIPTION

Figure 1:
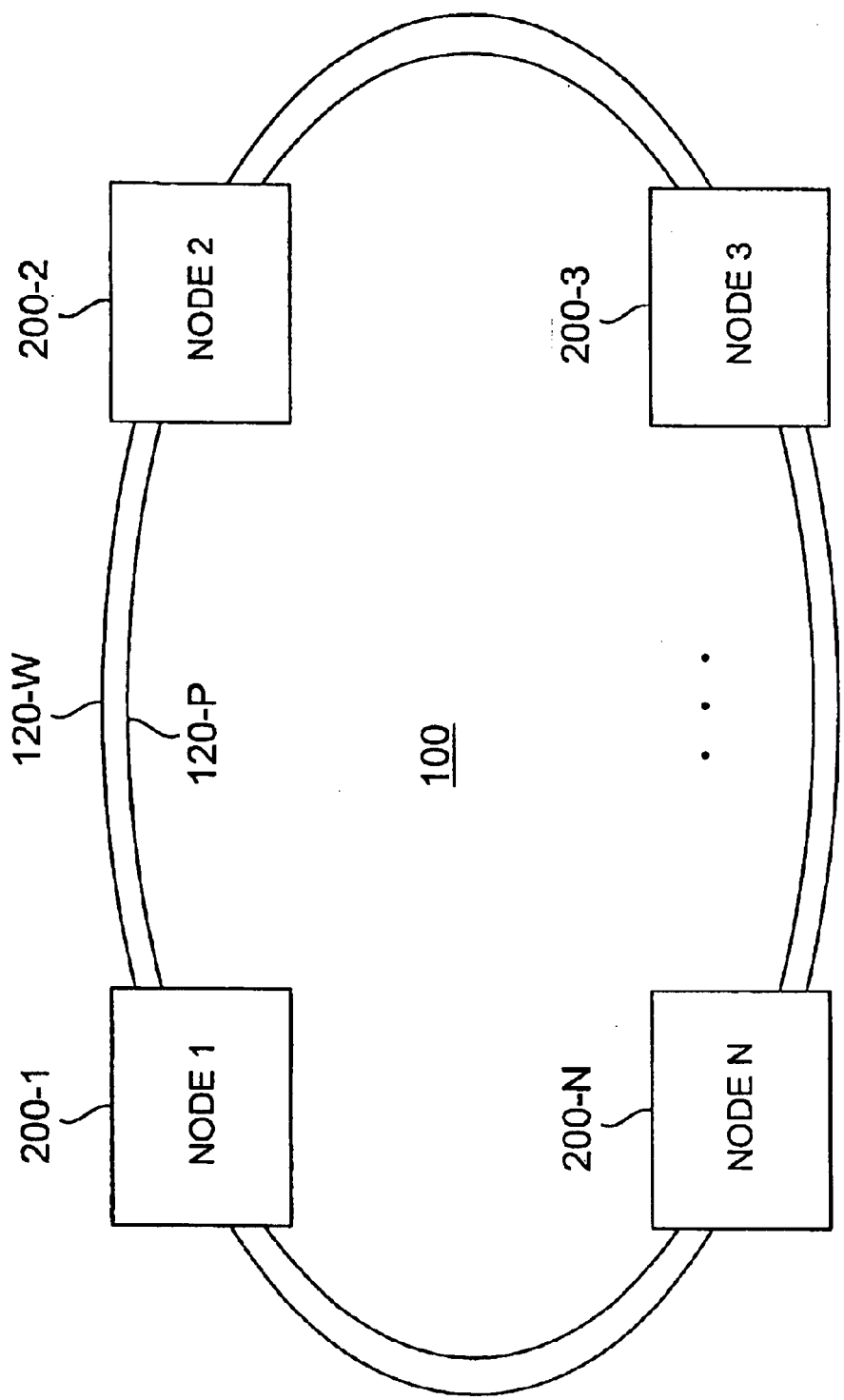
FIG. 1 illustrates a conventional optical network environment.

FIG. 1 illustrates a ring network 100 where the present invention may be employed. As shown in FIG. 1, the ring network 100 includes a number of nodes 200-N, such as nodes 200-1 through 200-N, discussed further below in conjunction with FIG. 2 and hereinafter collectively referred to as nodes 200, connected to one another by redundant optical links 120-W, 120-P. The optical link 120-W is a working link and the optical link 120-P is a protection link. The optical links 120-W, 120-P can be embodied, for example, as single-mode optical fibers. The optical fiber pairs of the working and protections links, respectively, that connect the same nodes 200 can be a single optical cable. For a more detailed discussion of working and protection rings in optical networks, see, for example, R. Ramaswami and K. Sivarajan, Optical Networks: A Practitioner's Perspective, Morgan Kaufinan (1998), incorporated by reference herein.

While the present invention is illustrated using a ring network 100, other configurations of wavelength division multiplexing (WDM) networks are suitable, as would be apparent to a person of ordinary skill in the art. Generally, the protection ring 120-P provides redundancy in the event of a failure in the working ring 120-R, in a known manner. The protection ring 120-P is thus a shared resource that is reconfigured based on the nature of a given fault. In addition, the network 100 may comprise a number of nodes 200 correlated with the number of wavelengths used to transmit signals.

In one implementation, each node can use, for example, two OADM units, each corresponding to the working and protection links 120-W and 120-P. The first OADM receives optical signals from a portion of the working link 120-W, circulating in one direction along the working ring. The second OADM receives optical signals from a portion of the protection link 120-P, circulating in the other direction along the protection ring.

Figure 2:
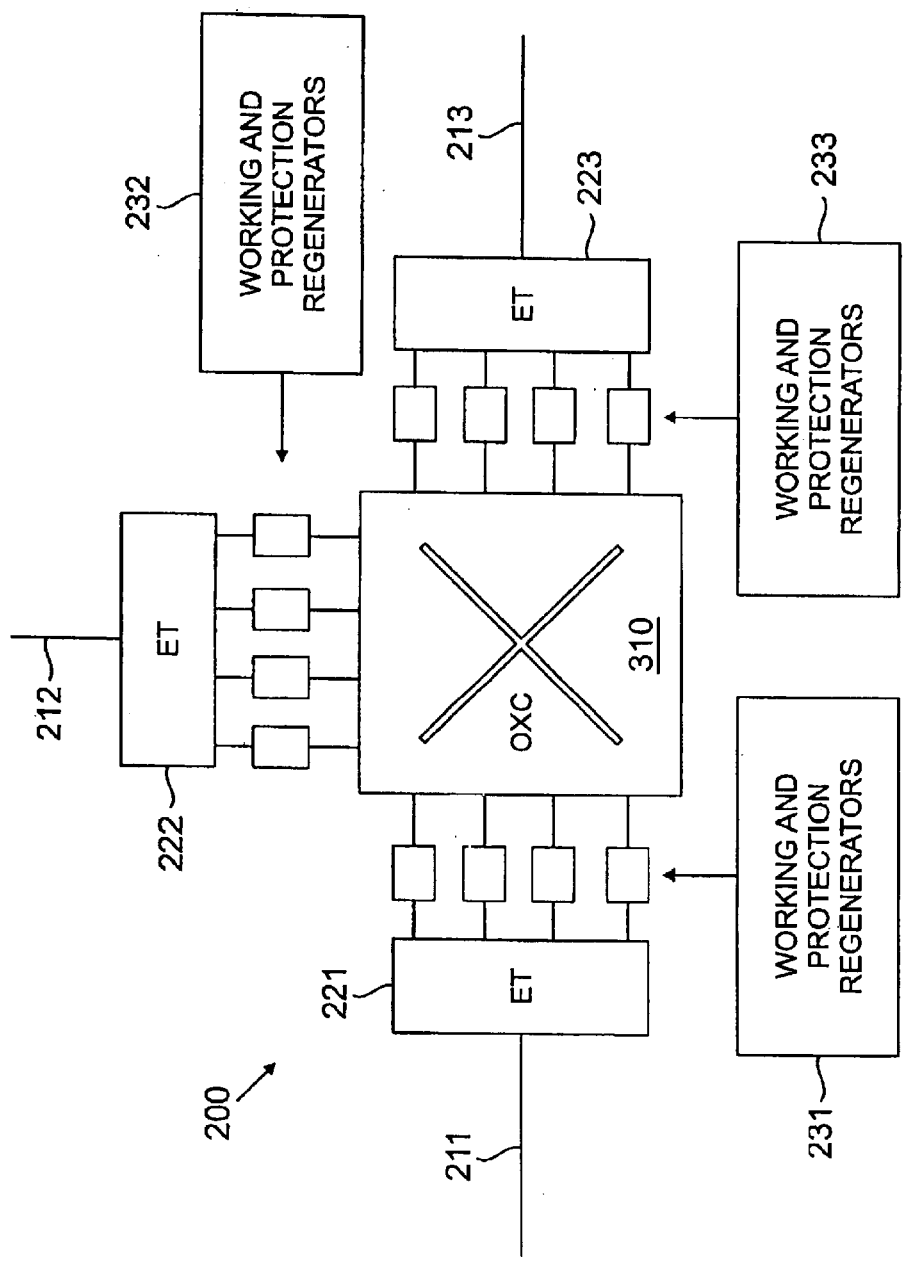
FIG. 2 is a schematic block diagram of an illustrative conventional node in the network of FIG. 1.

FIG. 2 is a schematic block diagram of an exemplary conventional node 200 in the network 100. The conventional node 200 may be embodied, for example, as one or more optical add/drop multiplexers (OADM) that add or drop channels based on wavelength that are local to the node, and passes (forwards) other channels onto the working ring 120-W. As shown in FIG. 2, each node 200 includes a number of optical links, such as links 211–213, each having a protection link and a working link.

Each link is received at the node 200 by a corresponding end terminal (ET) 221–223 that, e.g., demultiplexes the received signal, in a known manner. Thereafter, the received optical signals are terminated at regenerators 231–233, often referred to as optical termination units (OTUs), before being processed by the optical cross connect (OXC) 210 that routes the received optical signals to the appropriate output port or local destination, in a known manner. The regenerators 231–233 typically perform 3R regeneration, as described, for example, in R. Ramaswami and K. Sivarajan, incorporated by reference above. Thus, as previously indicated, in conventional nodes 200 of optical networks 100, fibers in both the working and protection rings 120-W, 120-P are terminated at each node (i.e., at the end of each optical link) by the working/protection regenerators 231–233. Among other reasons, the optical signals are terminated at each node 200 to allow the protection ring 120-P to be dynamically reconfigured in the event of a failure.

The present invention recognizes that while the forced termination of the protection ring 120-P is desirable to achieve reconfigurability, the corresponding forced termination of the working ring 120-W in conventional optical networks 100 unnecessarily increases system cost. Thus, according to one feature of the present invention, discussed below in conjunction with FIG. 3, each node 300 in accordance with the present invention forces the termination of the received optical signals only on the protection ring 120-P. In other words, the present invention does not force termination on the working ring 120-W (unless necessary), but only on the protection ring 120-P.

Figure 3:
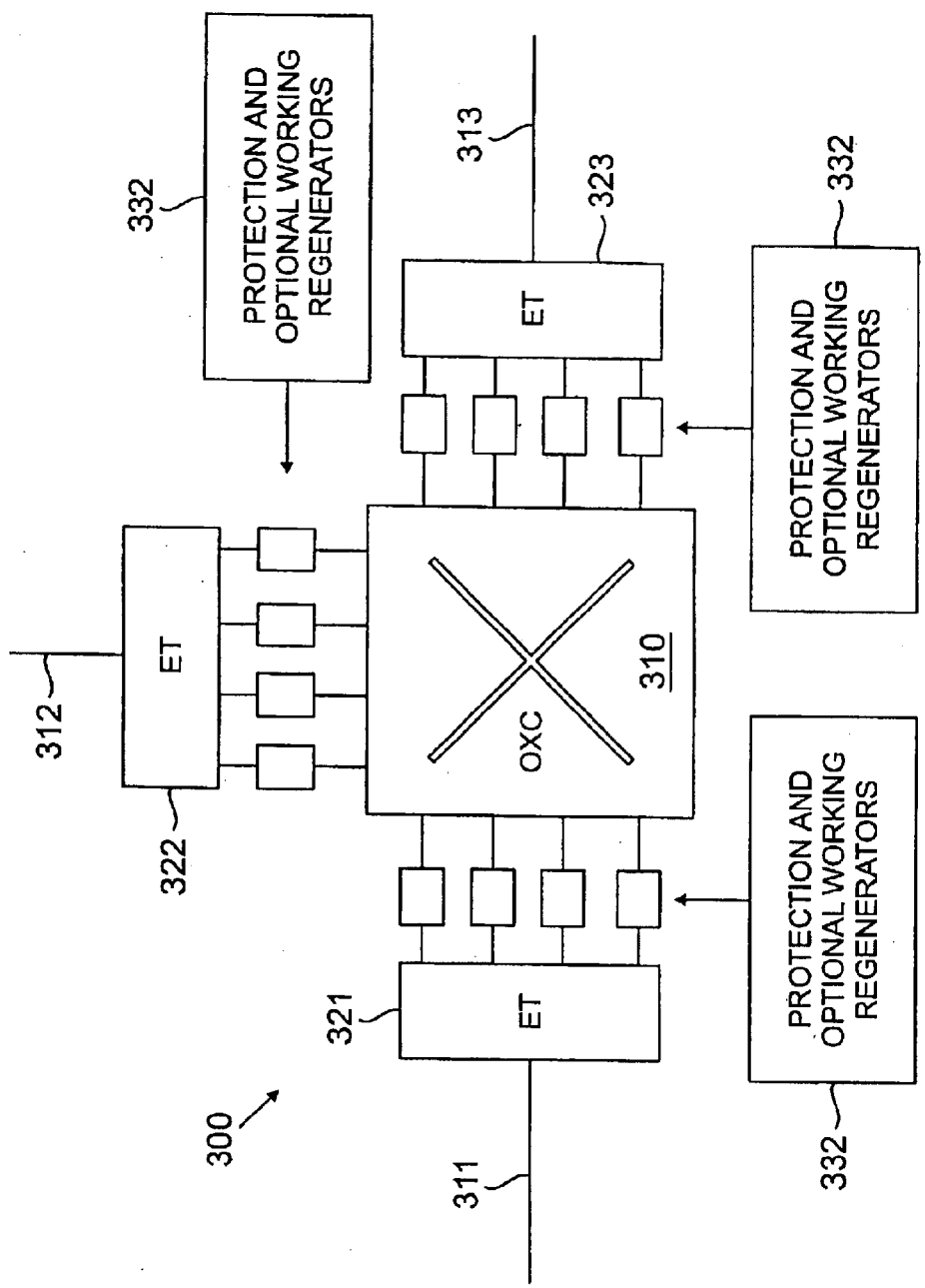
FIG. 3 illustrates a node in accordance with the present invention that may be utilized in the optical network of FIG. 1.

Thus, as shown in FIG. 3, a node 300 in accordance with the present invention may be embodied in a similar manner to conventional nodes 200 (FIG. 2), as modified herein to provide the features and functions of the present invention. Specifically, the location of the regenerators 331–333 in the nodes 300 of the present invention are modified to only force terminate the protection ring 120-P. In addition, the working link of the end-to-end path associated with each signal is evaluated and regenerators are positioned at various nodes along the path to maintain desired optical signal-to-noise ratio performance. Thus, as shown in FIG. 3, each link 311–313 on a node 300 includes a regenerator 331–333 for the protection link and an optional regenerator 331–333 for the working link. The optional working link regenerators 331–333 are utilized only when the optical signal will not arrive at the next node with a satisfactory optical SNR. It is noted that in certain architectures, it is also possible to regenerate along the link 311–313 between two nodes.

It is to be understood that the embodiments and variations shown and described herein are merely illustrative of the principles of this invention and that various modifications may be implemented by those skilled in the art without departing from the scope and spirit of the invention.

I claim:

1. A communication node that communicates optical signals using at least one working link and at least one protection link, comprising:

an input for receiving an optical signal on said at least one working link;

an input for receiving an optical signal on said at least one protection link; and one or more regenerators for terminating substantially all optical signals on said at least one protection link and for terminating optical signals on said at least one working link based on performance requirements.

2. The communication node according to claim 1, wherein said node is an optical add-drop multiplexer.

3. The communication node according to claim 1, wherein said communication node is a part of a ring network.

4. The communication node according to claim 1, wherein said protection link is part of a protection ring.

5. The communication node according to claim 1, wherein said working link is part of a working ring.

6. The communication node according to claim 1, wherein said performance requirements include a minimum optical signal-to-noise ratio.

7. An optical device that communicates optical signals using at least one working link and at least one protection link, comprising:

an input for receiving an optical signal on said at least one protection link, wherein each of said optical signals received on said at least one protection link are terminated; and an input for receiving an optical signal on said at least one working link, wherein only a portion of said optical signals received on said at least one working link are terminated based on performance requirements.

8. The optical device according to claim 7, wherein said node is an optical add-drop multiplexer.

9. The optical device according to claim 7, wherein said communication node is a part of a ring network.

10. The optical device according to claim 7, wherein said performance requirements include a minimum optical signal-to-noise ratio.

11. The optical device according to claim 7, further comprising at least one regenerator for terminating said signals.

12. A method for terminating signals in an optical network comprised of at least one working link and at least one protection link, comprising:

terminating substantially all optical signals received on said at least one protection link; and terminating optical signals on said at least one working link based on performance requirements.

13. The method according to claim 12, wherein said optical network includes a node embodied as an optical add-drop multiplexer.

14. The method according to claim 12, wherein said optical network is a ring network.

15. The method according to claim 12, wherein said performance requirements include a minimum optical signal-to-noise ratio.

* * * * *